(12) United States Patent
Wiggins et al.

(10) Patent No.: US 9,930,996 B2
(45) Date of Patent: Apr. 3, 2018

(54) FLIP TOP PLASTIC LID (71) Applicant: Mead Johnson Nutrition Company, Glenview, IL (US)

(72) Inventors: Robin P. Wiggins, Newburgh, IN (US); Johanna Kahn, Deerfield, IL (US)

(73) Assignee: Mead Johnson Nutrition Co., Chicago, IL (US)

( * ) Notice: Subject to any disclaimer, the term of this patent is extended or adjusted under 35 U.S.C. 154(b) by 43 days.

(21) Appl. No.: 14/515,086

(22) Filed: Oct. 15, 2014

(65) Prior Publication Data
US 2016/0000270 A1    Jan. 7, 2016

Related U.S. Application Data (63) Continuation-in-part of application No. 14/321,022, filed on Jul. 1, 2014.

(51) Int. Cl.
*A47J 47/06* (2006.01)
*B65D 77/24* (2006.01)
(Continued)

(52) U.S. Cl.
CPC ............... *A47J 47/06* (2013.01); *A47J 47/04* (2013.01); *A47J 47/10* (2013.01); *B65D 5/66* (2013.01); *B65D 21/0217* (2013.01); *B65D 43/08* (2013.01); *B65D 51/246* (2013.01); *B65D 51/247* (2013.01); *B65D 77/245* (2013.01); *B65D 43/16* (2013.01); *B65D 2231/00* (2013.01); *B65D 2251/1008* (2013.01)

(58) Field of Classification Search
CPC . A47J 47/06; A47J 47/10; A47J 47/02; B65D 51/246; B65D 5/66; B65D 5/6697; B65D 43/16; B65D 43/08; B65D 43/162; B65D 2251/1008; B65D 51/247
USPC ........................................................ 220/849
See application file for complete search history.

(56) References Cited

U.S. PATENT DOCUMENTS 205,075 A  *  6/1878  Griffin .......................... 220/324
D141,686 S     6/1945  Hagle
(Continued)

FOREIGN PATENT DOCUMENTS

CN    301359950    10/2010
EP    0683107      11/1995
(Continued)

*Primary Examiner* — Jeffrey Allen
*Assistant Examiner* — Jennifer Castriotta
(74) *Attorney, Agent, or Firm* — OspreyIP, pllc; James R. Cartiglia; Bethany J. Whelan (57) ABSTRACT

A closure for a container for storing granulated powder. The closure includes a collar and a lid, a locking portion on the collar, and a locking portion on the lid, the collar locking portion operable to releasably engage the lid locking portion when the lid is in a closed position on the collar. The closure further includes a latch element on the collar and a latch element on the lid, the collar last element operable to releasably engage the lid locking portion. Some embodiments are operable to provide two audible sounds verifying the lid has been properly closed. Some embodiments include a modified elongated scoop having a length equal to the diameter of the inner perimeter of the lid for improved user experience scooping product from the bottom of a container.

11 Claims, 9 Drawing Sheets

(51) Int. Cl.
*B65D 51/24* (2006.01)
*A47J 47/10* (2006.01)
*B65D 5/66* (2006.01)
*B65D 43/08* (2006.01)
*A47J 47/04* (2006.01)
*B65D 21/02* (2006.01)
*B65D 43/16* (2006.01)

(56) References Cited

U.S. PATENT DOCUMENTS

| | | | |
|---|---|---|---|
| 3,013,436 A | 12/1961 | Dailey | |
| 5,312,011 A * | 5/1994 | Fischer | B65D 21/022 206/508 |
| 5,706,974 A | 1/1998 | Murdick et al. | |
| D394,611 S | 5/1998 | La Gro | |
| D394,011 S | 7/1998 | Henriksson | |
| 5,810,188 A | 9/1998 | Navokoski et al. | |
| D473,140 S | 4/2003 | Gilliam et al. | |
| 6,761,279 B1 * | 7/2004 | Martin | B65D 43/169 220/254.3 |
| D504,318 S | 4/2005 | Lane et al. | |
| 7,040,500 B2 * | 5/2006 | Kipperman | A61J 9/00 206/553 |
| 7,175,041 B2 | 2/2007 | Ekkert | |
| D543,800 S | 6/2007 | Kwan | |
| D588,947 S | 3/2009 | Curtin | |
| 7,562,786 B2 | 7/2009 | Morrison | |
| D610,413 S | 2/2010 | Kahan et al. | |
| 7,971,747 B2 | 7/2011 | Blomdahl et al. | |
| D646,592 S | 10/2011 | Hood et al. | |
| 8,313,001 B1 | 11/2012 | Reid | |
| 8,590,732 B2 | 11/2013 | Vandamme et al. | |
| 2004/0094551 A1 * | 5/2004 | Mavin | B29C 65/5057 220/258.2 |
| 2007/0284276 A1 * | 12/2007 | Luttik | B65D 21/022 206/508 |
| 2008/0156858 A1 * | 7/2008 | Perry | B65D 25/2897 229/104 |
| 2010/0051631 A1 * | 3/2010 | Blomdahl | B65D 51/247 220/735 |
| 2010/0308065 A1 * | 12/2010 | Vandamme | B65D 43/169 220/697 |
| 2012/0000925 A1 * | 1/2012 | Dols | B65D 43/169 220/810 |
| 2012/0205375 A1 | 8/2012 | Hudson et al. | |
| 2012/0205376 A1 | 8/2012 | Yang et al. | |
| 2012/0279964 A1 | 11/2012 | McGeough | |
| 2013/0081364 A1 | 4/2013 | Piscopo | |
| 2014/0131355 A1 * | 5/2014 | Jentis | B65D 43/169 220/212 |
| 2015/0210450 A1 * | 7/2015 | Mercado | B65D 51/228 220/258.2 |

FOREIGN PATENT DOCUMENTS

| | | |
|---|---|---|
| EP | 0773172 | 5/1997 |
| EP | 1013562 | 6/2000 |
| EP | 1503648 | 8/2007 |
| EP | 1963062 | 9/2008 |
| EP | EM001671108 | 2/2010 |
| EP | 2241515 | 10/2010 |
| EP | EM002067850 | 9/2012 |
| FR | 2490191 | 3/1982 |
| WO | 2012085783 | 6/2012 |
| WO | 2013109174 | 7/2013 |
| WO | 2016003568 | 1/2016 |

* cited by examiner

FLIP TOP PLASTIC LID

The present application is a continuation-in-part of copending and commonly assigned U.S. application entitled Measuring Device and Container, having Ser. No. 14/321,022 filed Jul. 1, 2014, the disclosure of which is incorporated by reference herein in its entirety.

TECHNICAL FIELD

The present disclosure relates to a closure for a container for holding a granular product or powder, such as infant formula. More specifically, the disclosure is directed to a closure having a collar and a flip top lid for resealably securing the open end of a container.

BACKGROUND

There are many products in granular or powdered form that are currently stored and sold in containers. These products include infant formula, flour, coffee, sugar, and nutritional supplements, such as protein or dietary supplements. Because many of these items are stored, shipped, and ultimately dispensed from the same container, the container should be robust enough to withstand the conditions to which it can be exposed. Additionally, the container should be user friendly for the ultimate consumer.

Containers formed of plastic and/or metal are often used to store and sell various granular products, particularly in the industrial, food, and pharmaceutical sectors. Some containers may include a lid or closure such that the container can be repeatedly opened and closed. One problem often associated with such containers is leakage of the product from the container. Such leakage typically occurs in the area around the closure. Moreover, if a lid or closure does not provide an adequate seal, contaminants can more readily be introduced into the product stored in the container, resulting in spoilage or other deleterious effects. As such, while some containers include resealable lids which a user can open and close to access product contained within the container, many of these lids do not provide a sufficiently secure seal.

Furthermore, current containers do not sufficiently provide verification that the container is sealed when in a closed position. The consumer closes the lid on the container, but cannot be sure the product will not leak. Thus, it is desirable to give the consumer a discernible verification that the container is properly sealed when the lid is closed.

Additionally, some containers include a measuring device or scoop which allows the consumer to remove the product from the container, and, in certain circumstances, measure out the amount of product needed for each use. However, conventional scoops can make it difficult for the consumer to obtain product as the level of the contents of the container lowers.

Accordingly, there exists the need for a closure for a container that more completely seals the contents of the container, in order to prevent any leakage from the container, and to prevent contaminants from contacting the contents of the container. Additionally, there exists a need for a container that provides a discernible verification to the consumer that the container has been properly sealed when the lid is closed. Additionally, there exists a need for a container having a scoop better able to facilitate obtaining product located generally towards the bottom of the container.

BRIEF SUMMARY

In one aspect of the present invention, an improved closure for a container is provided. The closure can include a collar and a lid. In some embodiments, the collar can have a locking portion (referred to as "collar locking portion") and the lid can have a locking portion (referred to as "lid locking portion"). The collar locking portion and the lid locking portion operate so as to engage each other; for instance, in one embodiment, the lid locking portion is operable to releasably engage the collar locking portion when the lid is in a closed position on the collar, thereby securing the lid to the collar. In other embodiments, the closure can also include a collar latch element located on an outer surface of the collar and a lid latch element located on an outer surface of the lid, the collar latch element and the lid latch element being operable to releasably engage each other, thereby further securing the lid to the collar when the collar is in a closed position.

In some embodiments, the collar locking portion and the lid locking portion can provide an audible sound when the two locking portions engage each other. Similarly, the collar latch element and the lid latch element can provide a second audible sound when they engage each other. This feature can provide a user with discernible verification that the container and its contents have been properly closed and sealed.

The lid of the closure can, in some embodiments, include a retention element configured to retain a measuring device proximate an underside of the lid. In certain embodiments the retention device can be configured to store a measuring device having a length which is approximately equal to the diameter of the underside of the lid, and which is a substantial percentage of the depth of the container, so as to allow a user to more easily remove product from the bottom of a container. By retaining the scoop in a position proximate the underside of the lid, the scoop is stored above the level of the product in the container, to avoid forcing the user to insert his/her hand into the product to access the scoop. This avoids inconveniencing the user and also the possibility of contamination from the user's hand.

In an embodiment, the closure includes a lid having a top surface and a compartment for a scoop in the top surface of the lid. Such an embodiment allows the scoop to be stored above the level of the product between use.

BRIEF DESCRIPTION OF THE DRAWINGS

FIG. 12b is a top view of the modified scoop of FIG. 12a.

DETAILED DESCRIPTION

Reference now will be made in detail to the embodiments of the present disclosure. It will be apparent to those skilled in the art that various modifications and variations can be made to the teachings of the present disclosure without departing from the scope of the disclosure. For instance, features illustrated or described as part of one embodiment, can be used with another embodiment to yield a still further embodiment.

Thus, it is intended that the present disclosure covers such modifications and variations as come within the scope of the appended claims and their equivalents. Other objects, features and aspects of the present disclosure are disclosed in or are apparent from the following detailed description. It is to be understood by one of ordinary skill in the art that the present disclosure is a description of exemplary embodiments only and is not intended as limiting the broader aspects of the present disclosure.

For the sake of clarity, not all reference numerals are necessarily present in each drawing Figure. In addition, positional terms such as "upper," "lower," "side," "top," "bottom," "vertical," "horizontal," etc. refer to the container when in the orientation shown in the drawings. The skilled artisan will recognize that containers can assume different orientations when in use.

Figure 1:
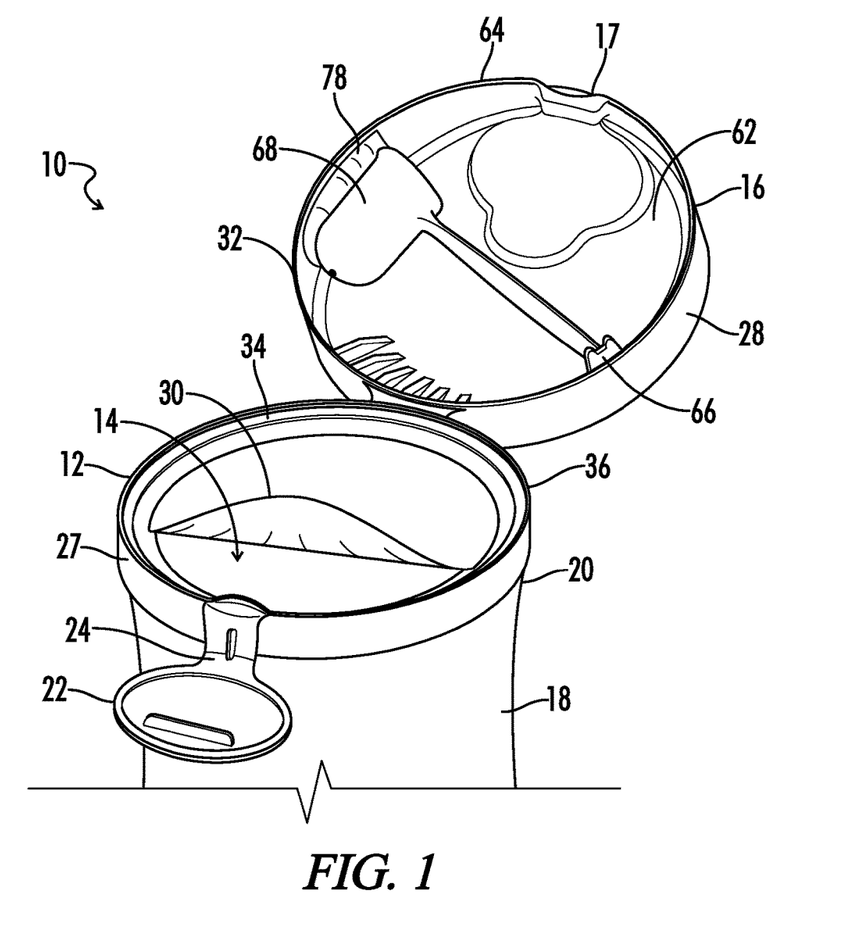
FIG. 1 is a perspective view of an embodiment of a closure of the present invention in an open position.

A perspective view of an embodiment of a closure 10 of the present invention is shown in FIG. 1; closure 10 is intended for use in closing a container 18. Closure 10 includes a collar 12 having a central opening 14. A lid 16 can releasably engage collar 12 such that lid 16 covers central opening 14. In FIG. 1, lid 16 is pivotally attached to collar 12 such that lid 16 can pivot between an open position where a front side 17 of the lid 16 is disengaged from collar 12, and a closed position where the front side 17 of lid 16 engages collar 12 and lid 16 covers central opening 14. Lid 16 is seen in an open position in FIG. 1. In certain embodiments, lid 16 and collar 12 are pivotally connected via hinge structure such as a living hinge. In other embodiments, lid 16 and collar 12 are two separate pieces, and lid 16 can be press fit onto collar 12 by the user to engage collar 12 with lid 16 and place lid 16 in a closed position.

In some embodiments the shape of collar 12 and lid 16 is complementary to the shape of container 18. For instance, when container 18 is cylindrical, having a generally circular cross-section, collar 12 and lid 16 can have a generally circular shape, as shown in FIG. 1. However, collar 12 and lid 16 can be manufactured in a variety of shapes and sizes, including elliptical, oval, square, rectangular, hexagonal, etc. For each of these shapes, lid 16 can be pivotally attached to collar 12 (such as by a living hinge), or lid 16 and collar 12 can be two separate pieces, lid 16 being press fit onto collar 12 to engage lid 16 with collar 12 and place the lid 16 in a closed position. In other embodiments, the shape of the upper end 20 of the container 18 can be complementary to the shape of the collar 12 and the lid 16, and the remainder of the container 18 can have a different shape.

Collar 12 can be configured to engage and connect to container 18. Container 18 can have an open upper end 20. Closure 10 can be configured such that when collar 12 is connected to container 18, central opening 14 is concentric with open upper end 20 of container 18. As such, when lid 16 is engaged with collar 12 in the closed position, lid 16 can cover both the central opening 14 in collar 12 and open upper end 20 in container 18.

Closure 10 may also include collar latch element 22. collar latch element 22 can be located on an outer surface 27 of collar 12. In some embodiments, collar latch element 22 is a latch that can be pivotally attached to collar 12 via mechanical fasteners commonly known in the art, such as bolts or pins. In some embodiments, collar latch element 22 is pivotally attached to collar 12 via a living hinge 24 such that collar 12 and collar latch element 22 can be manufactured as one integral piece. Having collar 12 and collar latch element 22 pivotally attached via living hinge 24 can also reduce the time associated with assembling closure 10 during manufacture because collar latch element 22 does not have to be connected to collar 12 via a secondary operation (whether manually or through automation). Lid 16 can also include a lid latch element 26, seen in FIG. 5, located on an outer surface 28 of lid 16. Collar latch element 22 can be configured to engage lid latch element 26 to secure lid 16 to collar 12 in a closed position. In other embodiments, lid latch element 26 is a latch that can be pivotally attached to lid 16 via mechanical fasteners, such as bolts or pins. In some embodiments, lid latch element 26 is pivotally attached to lid 16 via a living hinge. Collar 12 can include a collar latch element 22 located on an outer surface of collar 12. Lid latch element 26 can be configured to engage collar latch element 22 to secure lid 16 to collar 12 in a closed position.

Referring again to FIG. 1, some embodiments of container 18 that store granular product such as infant formula or food products include a heat sealed flexible membrane 30 removably attached to the open upper end 20 of container 18. Flexible membrane 30 remains on container 18 during distribution of container 18, and is opened by a consumer prior to the first use of the product. Flexible membrane 30 can serve as both a protective barrier preventing contaminants from reaching the product during shipping and as a tamper evident mechanism indicating that a consumer should not buy or use the product if flexible membrane 30 has been tampered with or removed.

In such embodiments that include flexible membrane 30, collar 12 can be connected to open upper end 20 of container 18 such that flexible membrane 30 is located between collar 12 and open upper end 20 of container 18. Flexible membrane 30 can then be removed by the consumer by pulling flexible membrane 30 up through central opening 14 in collar 12, thereby giving the consumer access to the contents of container 18.

Lid 16 can have a lower perimeter 32. Collar 12 can include a lid mating surface 34. When lid 16 is in a closed position and engaging collar 12, lower perimeter 32 can be in mating contact with lid mating surface 34. In FIG. 1, lid mating surface extends laterally inward generally from an upper perimeter 36 of collar 12. As such, lower perimeter 32 of lid 16 can be positioned laterally inward from upper perimeter 36 of collar 12. It will be readily apparent to one of skill in the art that lid mating surface 34 of collar 12 can extend laterally outward from upper perimeter 36 such that lower perimeter 32 of lid 16 is positioned laterally outward from upper perimeter 36 when lid 16 is in the closed position.

Figure 2:
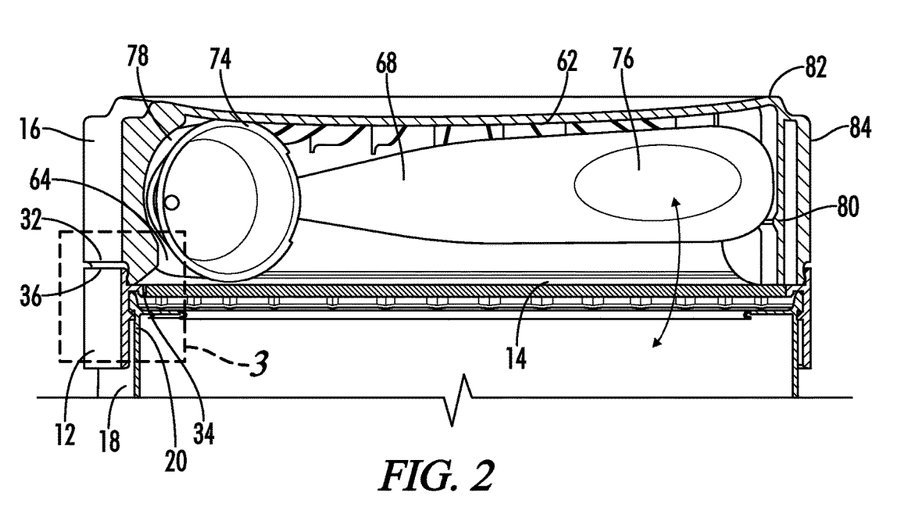
FIG. 2 is a cross sectional view of the closure of FIG. 1 in a closed position.

A cross sectional view of an embodiment of closure 10 of the present invention in a closed position is shown in FIG. 2. Lid 16 engages collar 12 such that lid 16 covers central opening 14 in collar 12. Lower perimeter 32 in the closed position engages collar 12 such that lower perimeter 32 is in contact with lid mating surface 34 on collar 12. Collar 12 is also shown connected to container 18.

Figure 3:
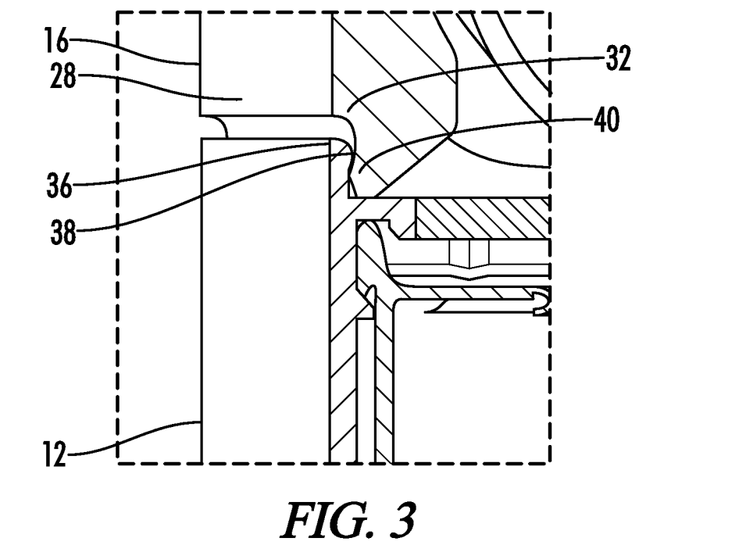
FIG. 3 is a detailed cross sectional view of an exemplary engagement between the collar and the lid of the closure of FIG. 1.

A detailed view of an exemplary engagement between lid 16 and collar 12 is shown in FIG. 3. Collar 12 has a collar locking portion 38. Lid 16 has a lid locking portion 40. Lid locking portion 40 is operable to releasably engage collar locking portion 38 when the lid is moved to a closed position. When lid locking portion 40 engages collar locking portion 38, lid 16 is releasably secured to collar 12 in the closed position.

In FIG. 3, collar locking portion 38 is a rim extending from upper perimeter 36 of collar 12. The rim of collar locking portion 38 extends laterally inward from upper perimeter 36 of collar 12 in FIG. 3. Lid locking portion 40 is a flange located on lower perimeter 32 of lid 16. The flange extends such that it is operable to engage the rim of collar locking portion 38. The flange in FIG. 3 is shown as extending from the lower perimeter of lid 16. In an embodiment, the flange extends from outer surface 28 of lid 16. In some embodiments, the rim of collar locking portion 38 annularly extends from the entirety of upper perimeter 36 of collar 12, and the flange of lid locking portion 40 can extend annularly from the entirety of lower perimeter 32 of lid 16. In certain embodiments, the rim of collar locking portion 38 extends from only a portion of upper perimeter 36 of collar 12, and the flange of lid locking portion 40 extends from only a portion of lower perimeter 32 of lid 16. In additional embodiments, one of collar locking portion 38 and lid locking portion 40 can extend annularly around the entire upper perimeter 36 of collar 12 or lower perimeter 32 of lid 16 respectively, while the other extends from only a portion of upper perimeter 36 of collar 12 or lower perimeter 36 of lid 16 respectively.

Although collar locking member 38 and lid locking member 40 are depicted as a rim extending from collar 12 and a flange extending from lid 16, respectively, these embodiments are in no way a limitation of the scope of the present invention. Collar locking member 38 and lid locking member 40 can be any suitable complimentary locking portions known in the art. For instance, locking portions 38 and 40 can be two corresponding flanges, one on collar 12 and one on lid 16. Additionally, collar locking member 38 could be a protrusion extending from collar 12 that is received through a corresponding recess in lid 16, or vice versa.

Figure 4:
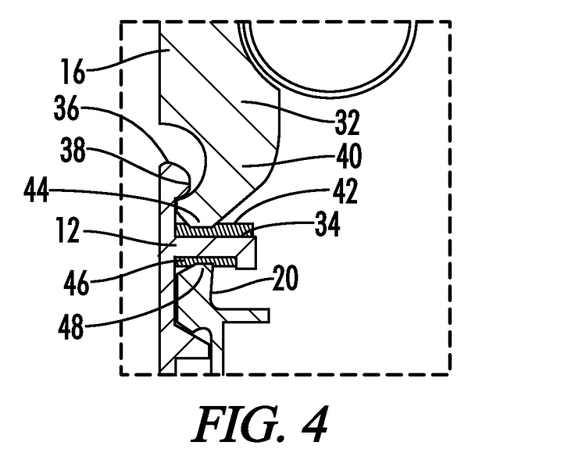
FIG. 4 is a detailed cross sectional view of a second exemplary engagement between a collar and a lid of the closure of FIG. 1.

A second exemplary engagement between collar 12 and lid 16 is shown in FIG. 4. Lid 16 is releasably secured to collar 12 as previously described for FIG. 3. In the embodiment shown in FIG. 4, the flange of lid locking member 40, when lid locking member 40 is engaged with the rim of collar locking member 38, is in contact with lid mating surface 34. Therefore, lower perimeter 32 of lid 16 contacts lid mating surface 34 of collar 12 via the flange. In some embodiments, lid mating surface 34 includes a lid sealing layer 42. When lid 16 is moved into a closed position and lid locking member 40 engages collar locking member 38, lower perimeter 32 via the flange engages sealing layer 42 on lid mating surface 34 such that sealing layer 42 is compressed. Lower perimeter 32 of lid 16 compressing sealing layer 42 creates an annular seal 44 between lid 16 and collar 12. The annular seal 44 formed by lower perimeter 32 of lid 16 being compressing sealing layer 42 can be a powder tight seal that will prevent the contents of container 18 from leaking between lid 16 and collar 12 when lid 16 is in the closed position.

Collar 12 may also include a collar sealing layer 46. Sealing layer 46 can be operable to engage open upper end 20 of container 18 when collar 12 is connected to container 18. When open upper end 20 of container 18 engages sealing layer 46, an annular seal 48 can be created between collar 12 and container 18. Annular seal 48 can also be a powder tight seal preventing the contents of container 18 from leaking between container 18 and collar 12. In such an embodiment, when collar 12 is connected to container 18 and lid 16 is in a closed position engaging collar 12, the contents of the container can be effectively sealed from leaking between both container 18 and collar 12, and collar 12 and lid 16.

In FIG. 3 and FIG. 4, lower perimeter 32 of lid 16 in the closed position is located inside upper perimeter 36 of collar 12. Similarly, collar locking portion 38 and lid mating surface 34 generally extend radially inward from upper perimeter 36 of collar 12, and lid locking portion 40 extends generally radially outward. It will be readily apparent to one of skill in the art that the orientation of the features previously described could be mirrored such that lower perimeter 32 of lid 16 is positioned outside of upper perimeter 36 of collar 12. As such, collar locking portion 38 and lid mating surface 34 can generally extend radially outward and lid locking portion 40 can generally extend radially inward. The two orientations function similarly to one another in securing lid 16 to collar 12 in the closed position.

Figure 5:
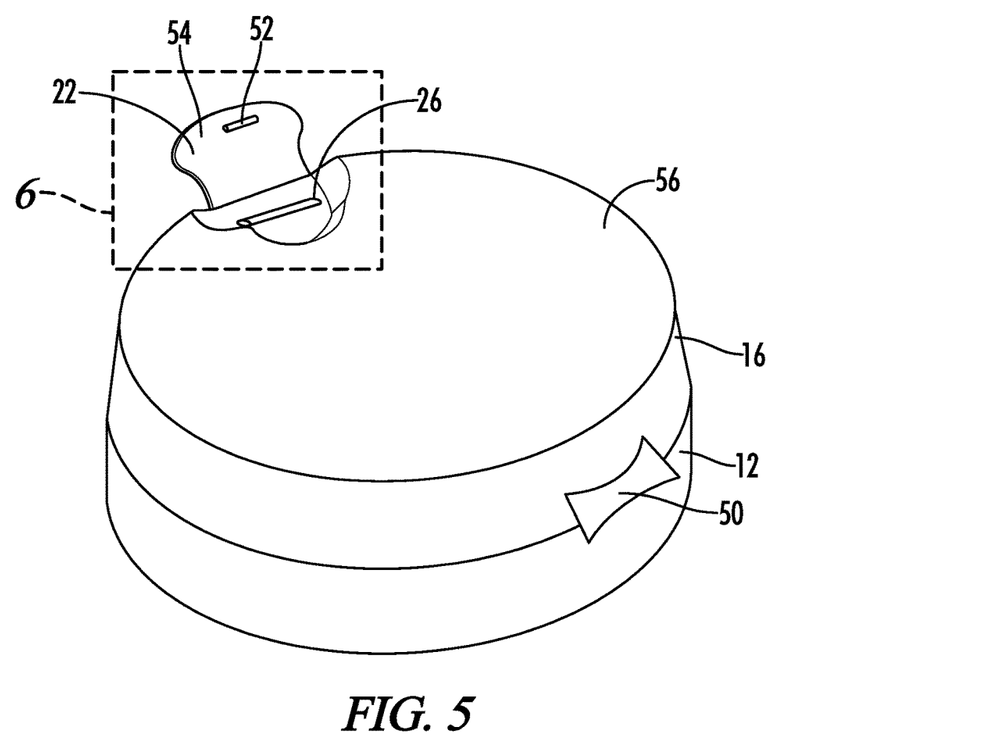
FIG. 5 is a back perspective view of the closure of FIG. 1.

FIG. 5 shows a back perspective view of an embodiment of closure 10 of the present invention. Lid 16 in this embodiment is pivotally connected to collar 12 via a living hinge 50. Lid 16 being connected to collar 12 via living hinge 50 allows lid 16 and collar 12 to be manufactured as one integral piece. Such an embodiment can eliminate one assembly operation during the manufacturing process. Collar 12 and lid 16 can also be produced as one color, or as two different colors to enhance aesthetic appearances. In some embodiments, lid 16 can be pivotally attached to collar 12 via mechanical fasteners commonly known in the art such as bolts or pins.

Figure 6:
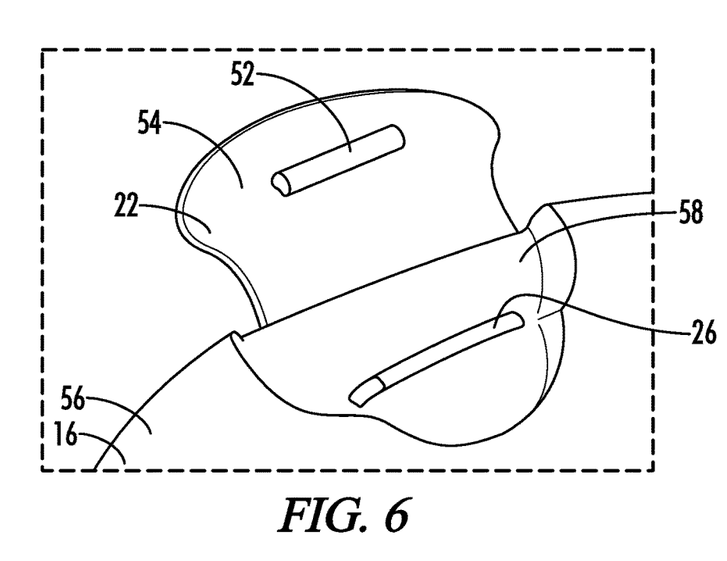
FIG. 6 is a detailed view of an exemplary first latch element and second latch element for the closure of FIG. 1.

An exemplary engagement between collar latch element 22 and lid 16 is also shown in FIG. 5. Lid 16 includes a lid latch element 26. Collar latch element 22 can be pivotally attached to collar 12 and be configured to engage lid latch element 26 when lid 16 is in the closed position. When collar latch element 22 engages lid latch element 26 on lid 16, lid 16 is further secured to collar 12. In some embodiments, as seen in FIG. 6, collar latch element 22 includes a protrusion 52 extending from an underside 54 of collar latch element 22. When lid 16 is in a closed position, collar latch element 22 can be rotated such that protrusion 52 releasably engages lid latch element 26 on lid 16.

Lid latch element 26 is shown in FIG. 6 as a second protrusion extending from lid 16. However, that is but one embodiment of the engagement between collar latch element 22 and lid latch element 26, and is not a limitation on the scope of this invention. It will be readily apparent to one skilled in the art that collar latch element 22 can engage lid latch element 26 in a variety of ways. For instance, in some embodiments lid latch element 26 can be a cavity in lid 16, the cavity configured to receive protrusion 52 on collar latch element 22. It will also be apparent to one of skill in the art that in some embodiments, lid latch element 26 can be pivotally attached to lid 16. As such, lid latch element 26 can include protrusion 52, and collar latch element 22 can be a second protrusion extending from outer surface 27 of collar 12. Collar latch element 22 can then be configured to releasably engage protrusion 52 on lid latch element 26.

Such an embodiment can allow a user to secure lid 16 to collar 12 in a closed position in two different ways. Lid 16 can be rotated such that lid locking portion 40 releasably engages collar locking portion 38, as previously described, to create a first securing measure. Subsequently, latch 22 can be rotated to engage lid latch element 26, creating a second securing configuration.

In some embodiments, lid 16 has a top surface 56, and lid latch element 26 can be located on top surface 56 of lid 16. Additionally, as shown in FIG. 5 and FIG. 6, in some embodiments top surface 56 of lid 16 can include a recess 58. Second latch element 26 can be located within recess 58, such that collar latch element 22 can be inserted into recess 58 to engage lid latch element 26. Recess 58 can allow for a user's fingers or hand to grab collar latch element 22 to facilitate disengaging collar latch element 22 from lid latch element 26 in order to open closure 10.

Figure 8:
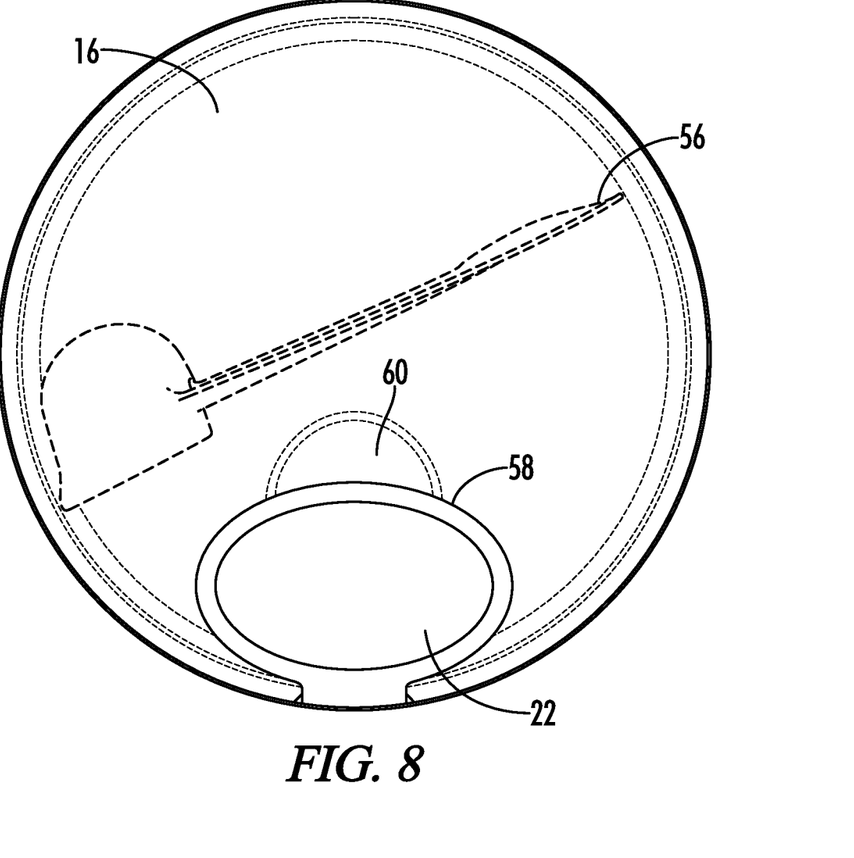
FIG. 8 is a top view of the closure of FIG. 1 when the lid is in a closed position with the first latch element engaging the second latch element.

In FIG. 8, closure 10 is shown with collar latch element 22 engaging lid latch element 26. Lid latch element 26 in FIG. 8 is located in recess 58 and collar latch element 22 is inserted into recess 58. From FIG. 8, it can be seen that a user can insert one or more fingers into the exposed portion 60 of recess 58 to disengage collar latch element 22 from lid latch element 26.

Another aspect of the present invention is a closure 10 that provides the user with a discernible verification that lid 16 has been sufficiently secured to collar 12 such that powder or the contents of container 18 will not leak from container 18. Accordingly, in some embodiments, collar locking portion 38 and lid locking portion 40 can be operable to provide an audible sound when lid locking portion 40 engages collar locking portion 38. Similarly, collar latch element 22 and lid latch element 26 can provide an audible sound when collar latch element 22 engages lid latch element 26. The two audible sounds created can be similar to the "click" sound produced by a conventional snap fit fastener.

The audible sounds produced when lid locking portion 40 engages collar locking portion 38 and when collar latch element 22 engages lid latch element 26 indicates to a user that lid 16 has been properly closed onto collar 12 such that product from container 18 will not leak or spill. The audible sounds produced can also indicate that the contents of container 18 have been properly sealed from potential contaminants outside of container 18.

Referring now to FIG. 1, in some embodiments of closure 10, lid 16 has an underside 62 and an inner perimeter 64. Lid 16 may also include a retention element 66 configured to retain a measuring device 68 proximate underside 62 of Lid 16. Retention element 66 may extend from inner perimeter 64 of lid 16, or from underside 62 of lid 16. One benefit of retention element 66 is that it can hold measuring device 68 outside of the product such that a user does not have to insert hands or fingers into the product to retrieve measuring device 68. This avoids inconvenience to the user and can help prevent contaminantes on a user's hands or fingers from coming into contact with the powder.

Figure 7:
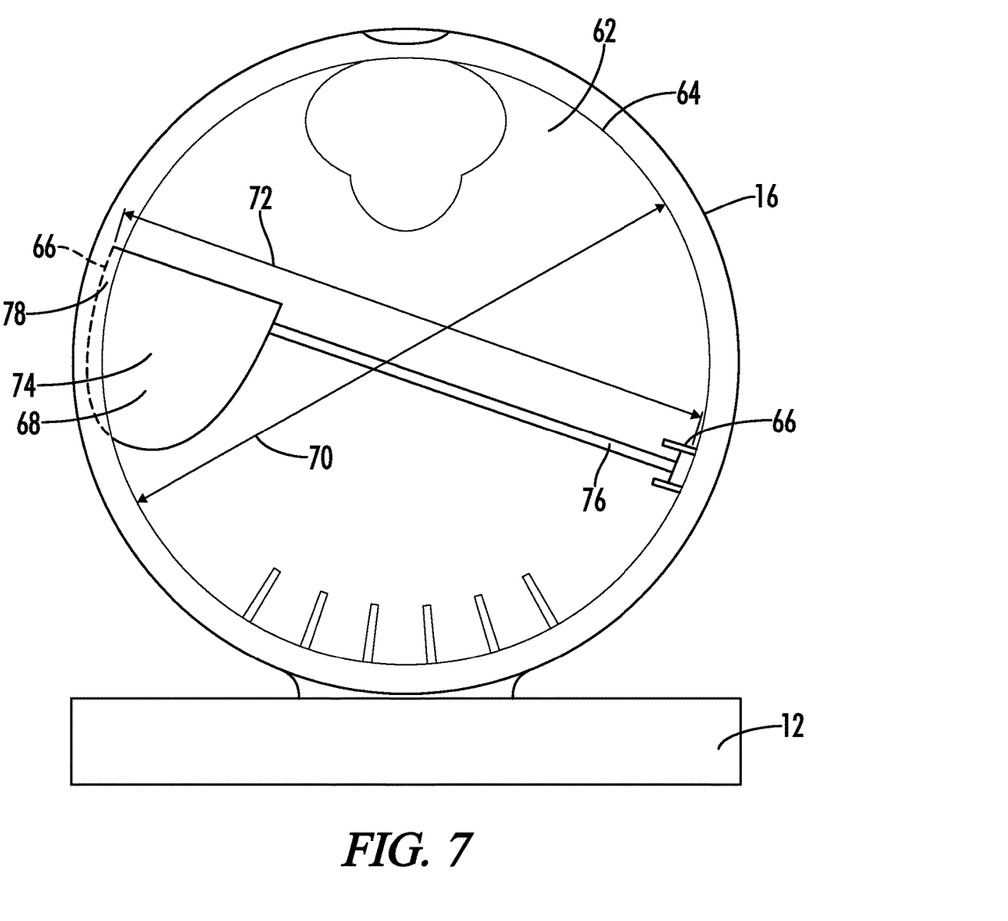
FIG. 7 is a front view of a collar and a lid of FIG. 1 when the lid is in an open position.

A front view of closure 10 in an open position is seen in FIG. 7. Inner perimeter 64 has a diameter 70. Measuring device 68 has a length 72. In some embodiments, retention element 66 can be configured to retain a measuring device having a length 72 that is approximately equal to diameter 70 of inner perimeter 64 of lid 16. Additionally, in some embodiments, retention element 66 can be configured to retain a measuring device having a length 72 that is a substantial percentage (i.e., at least 50% and, in some embodiments, from about 60% to about 140% of the height of container 18).

Measuring device 68 can include a bucket 74 and a handle 76. Retention element 66 can include a notch 78 in a portion of the inner perimeter, and a catch 80 extending from lid 16. Catch 80 can extend from a second portion of inner perimeter 64 of lid 16, or catch 80 can extend from underside 62 of lid 16. Notch 78 can receive bucket 74 and catch 80 can engage handle 76, thereby retaining measuring device 68 proximate underside 62 of lid 16.

A cross sectional view of measuring device 68 being retained proximate underside 62 of lid 16 can be seen in FIG. 2. Notch 78 in inner perimeter 64 can contour bucket 74 of measuring device 68. A user can place bucket 74 in notch 78. Measuring device can then be rotated upwards such that handle 76 engages and is secured by catch 80. To remove measuring device 68 from retention element 66, a user can pull down on handle 76 such that handle 76 disengages from catch 80, and bucket 74 can then be removed from notch 78.

Such an embodiment of retention device 68 allows an elongated measuring device 68 having a length 72 greater than diameter 70 of inner perimeter 64 to be retained proximate underside 62 of lid 16. One benefit of an elongated measuring device is that a user can more easily access, remove, and measure product or powder located generally at the bottom of container 18.

Figure 9:
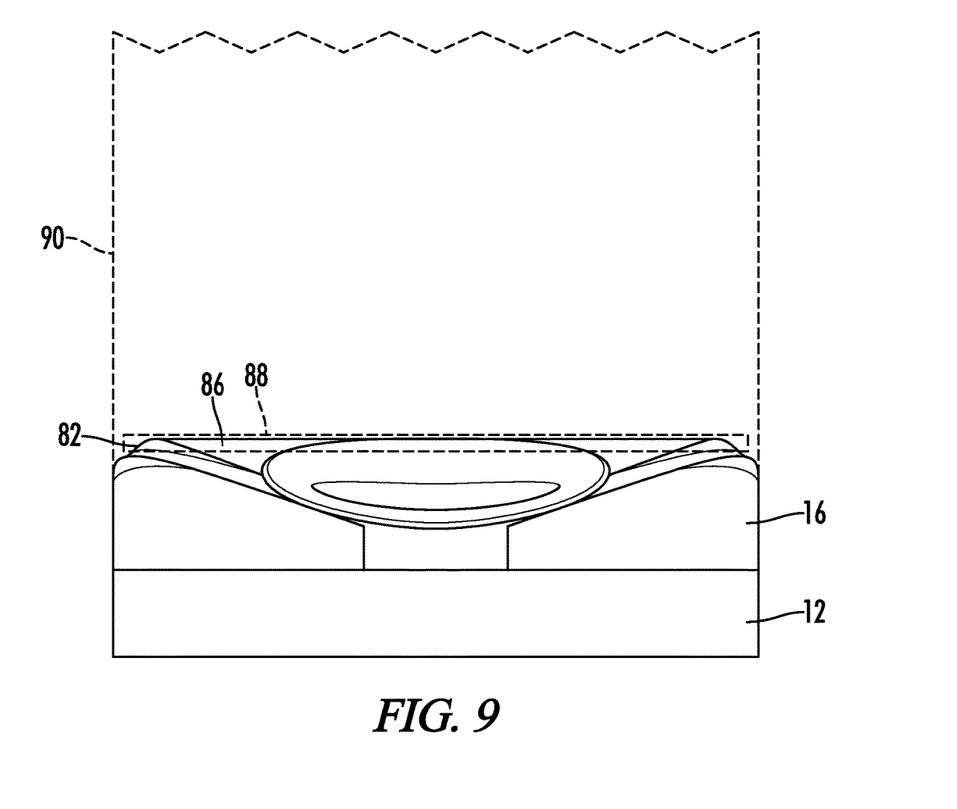
FIG. 9 is a front view of the closure of FIG. 1 in a closed position showing how multiple assembled containers can be stackable on one another.

Referring still to FIG. 2, lid 16 in some embodiments can include a raised circumferential portion 82. Raised circumferential portion 82 can be laterally inset from the outer perimeter 84 of lid 16. As shown in FIG. 9, raised circumferential portion 82 can be configured to receive a complementary recess 86 in a base 88 of a second container 90 such that multiple assembled containers in closed positions can be stacked on top of one another. Such a feature is beneficial for storing multiple containers in warehouses and on shelves in stores.

Figure 10:
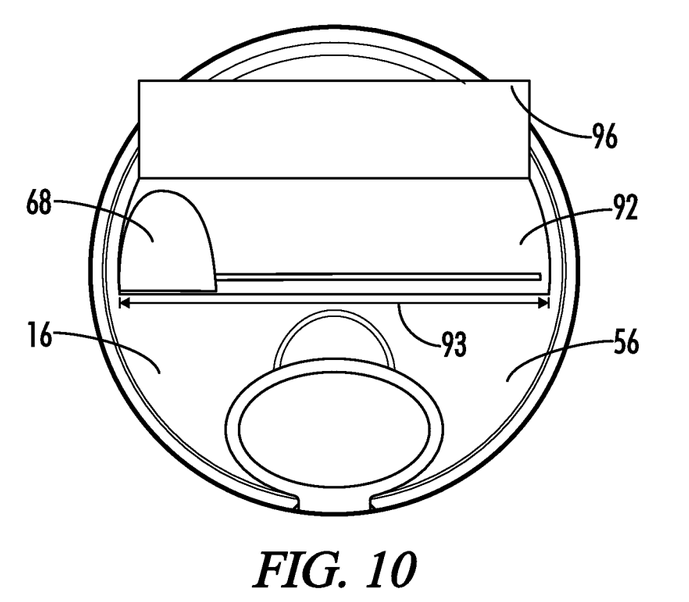
FIG. 10 is a top view of a second embodiment of a closure of the present invention including a compartment in a lid for storing a measuring device.
Figure 11:
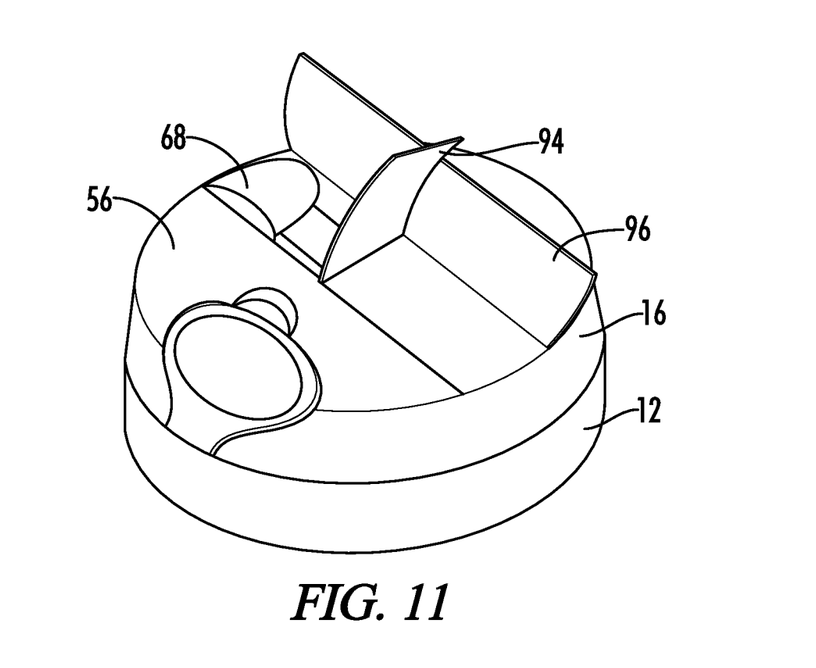
FIG. 11 is a perspective view of the embodiment of FIG. 10 showing a tamper evident material disposed on the lid and the compartment.

Another aspect of the present invention is shown in FIG. 10 and FIG. 11. In another embodiment of a retention element 66 for a measuring device 68, top surface 56 can include a compartment 92 configured to store a measuring device 68 before the first use of the container and between uses of the container. Compartment 92 can have a cover 96 that can engage top surface 56 of lid 16 to retain measuring device 68 in compartment 92. Compartment 92 can have a length 93 substantially equal to diameter 70 of inner perimeter 64 of lid 16. Compartment 92 allows measuring device 68 to be stored outside of container 18 and outside of the contents of container 18.

In some embodiments, closure 10 may include a tamper evident feature 94 disposed on the top surface 56 of lid 16 and compartment 92. Tamper evident feature 94 provides an indication of whether or not measuring device 68 has been contaminated, accessed, or damaged by a third person before a consumer uses or purchases the container. Tamper evident feature 94 can be removed by the consumer prior to their first use of the container. In FIG. 11, tamper evident feature 94 is a removable seal between top surface 56 of lid 16, compartment 92, and compartment cover 96. Removable seal 94 can be pulled off top surface 56 of lid 16 to expose measuring device 68. It will be readily apparent to one skilled in the art that tamper evident feature 94 can be a variety of different types of tamper evidence known in the art such as tamper evident strips, tapes, seals, labels, etc., associated with top surface 56 of lid 16, compartment 92, and compartment cover 96.

Figure 12A:
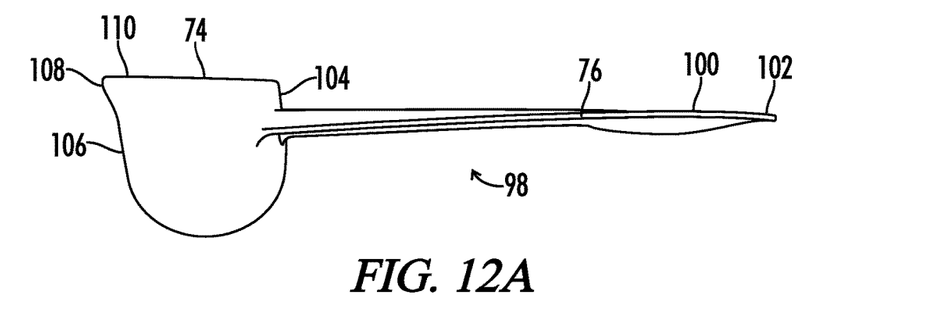
FIG. 12a is a side view of an embodiment of a modified scoop with a pointed end.
Figure 12B:
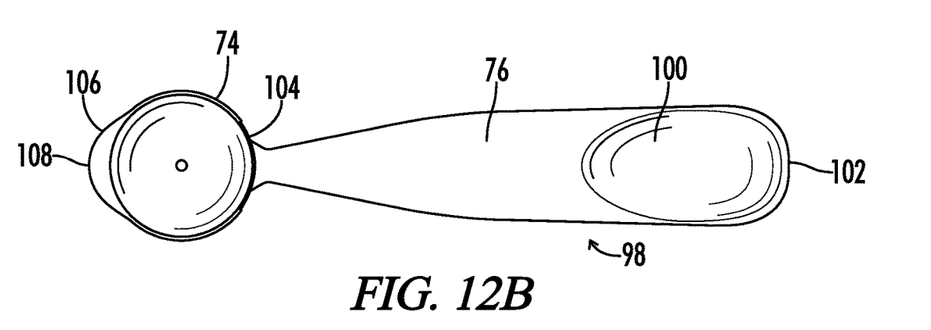

Another aspect of the present invention is a modified scoop 98, shown in FIG. 12a and FIG. 12b. Modified scoop 98 includes a bucket 74 and a handle 76. Handle 76 can include an indentation 100 near a gripping end 102 of handle 76. Bucket 74 can include a handle side 104 and a distal side 106. Distal side 106 can have a top edge 110. Handle side 104 is connected to handle 76. Top edge 110 of distal side 106 can be tapered away from handle 76 such that a pointed end 108 is formed on modified scoop 98.

Figure 12C:
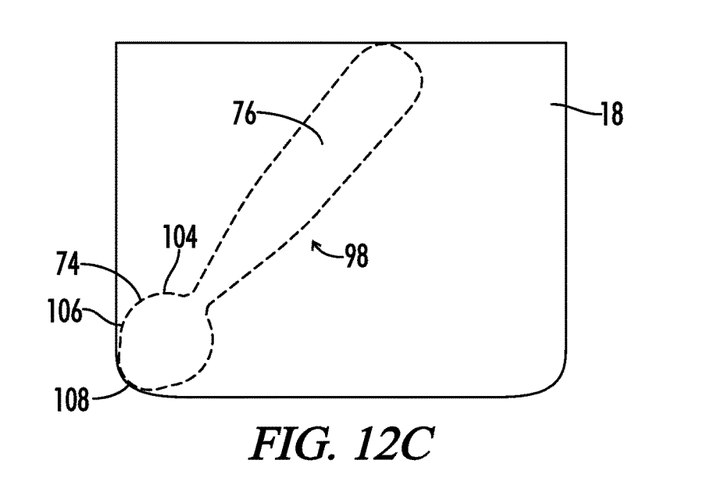
FIG. 12c shows the modified scoop of FIG. 12a being used in a container.

The benefit of modified scoop 98 is that product or powder at the bottom of container 18 can be more easily scooped with pointed end 108 of modified scoop 98. Modified scoop 98, as seen in FIG. 12c, more easily fits into small corners in different containers and can allow more powder to be removed more quickly from the bottom of containers than conventional scoops. This feature coupled with the ability of retention element 66 to be able to retain a modified scoop 98 having a length 72 greater than or equal to the diameter of inner perimeter 64 provides the user with a scoop that makes it easier to both get to the bottom of a container 18 and scoop powder off the bottom of container 18.

Although embodiments of the disclosure have been described using specific terms, devices, and methods, such description is for illustrative purposes only. The words used are words of description rather than of limitation. It is to be understood that changes and variations may be made by those of ordinary skill in the art without departing from the spirit or the scope of the present disclosure, which is set forth in the following claims. In addition, it should be understood that aspects of the various embodiments may be interchanged in whole or in part. Therefore, the spirit and scope of the appended claims should not be limited to the description of the versions contained therein.

Thus, although there have been described particular embodiments of the present invention of a new and useful FLIP TOP PLASTIC LID it is not intended that such references be construed as limitations upon the scope of this invention except as set forth in the following claims.

What is claimed is:

1. A closure for a container, comprising:
   a collar having a outer surface, a central opening, and a collar locking portion,
   a lid pivotally attached to the collar, whereby the lid can pivot between an open position and a closed position, the lid having an inner perimeter and a lower perimeter, and the collar further comprises a lid mating surface, the lower perimeter of the lid contacting the lid mating surface on the collar when the collar and the lid are in the closed position;
   wherein the lid mating surface further comprises a sealing layer such that the sealing layer is compressed to form a powder tight first annular seal between the lid and the collar when the lid and collar are in the closed position,
   the lid further comprising a lid locking portion, the lid locking portion operable to releasably engage the collar locking portion on the collar when the lid is in a closed position covering the central opening, thereby securing the lid to the collar in the closed position;
   a collar latch element located on the outer surface of the collar; a lid latch element located on the outer surface of the lid, the collar latch element configured to releasably engage the lid latch element when the lid is in the closed position, thereby further securing the lid to the collar in the closed position; and
   a measuring device retention element located on the lid, the lid further comprising an inner perimeter, the retention element comprising a notch defined on the inner perimeter of the lid, wherein the notch contours a bucket of a measuring device, the inner perimeter having a diameter, wherein the retention element is configured to retain a measuring device having a length greater than or approximately equal to the diameter of the inner perimeter, wherein the measuring device further comprises a handle, the bucket having a handle side and a distal side, the handle side connected to the handle, the distal side having a top edge, the top edge being tapered away from the handle to form a pointed end on the measuring device.

2. The closure of claim 1, wherein:
   the collar has an upper perimeter and the collar locking portion is a rim located on the upper perimeter of the collar; and
   the lid has a lower perimeter and the lid locking portion is a flange extending from the lower perimeter of the lid, the flange configured to engage the rim on the upper perimeter of the collar.

3. The closure of claim 1, wherein:
   the collar locking portion and the lid locking portion are operable to provide an audible sound when the lid locking portion engages the collar locking portion; and
   the collar latch element and the lid latch element are operable to provide an audible sound when the collar latch element engages the lid latch element.

4. The closure of claim 1, wherein the lid further comprises a top surface, the top surface having a recess, the lid latch element located in the recess.

5. The closure of claim 1, wherein the collar and the lid have a generally circular shape.

6. The closure of claim 1, wherein the lid further comprises a top surface, the top surface having a raised circumferential portion configured to receive a complimentary recess in a base of a container such that multiple assembled containers can be stacked on top of one another.

7. The closure of claim 1, wherein the lid is pivotally attached to the collar via a living hinge and the lid and collar are one continuous piece.

8. The closure of claim 1, wherein the collar further comprises a sealing layer operable to engage an open upper end of the container to create an annular seal between the collar and the container.

9. A closure for a container, comprising:
   a collar having a central opening;
   a lid configured to releasably engage the collar in a closed position such that the lid covers the central opening, the lid having an underside and a sidewall, the sidewall defining an inner perimeter, the inner perimeter having a diameter; and
   a retention element located on the lid, the retention element including a notch defined in the sidewall, wherein the notch contours a bucket of a measuring device, the retention element configured to retain the measuring device proximate to the underside of the lid, the measuring device having a length greater than or equal to the diameter of the inner perimeter, wherein the measuring device further comprises a handle, the bucket having a handle side and a distal side, the handle side connected to the handle, the distal side having a top edge, the top edge being tapered away from the handle to form a pointed end on the measuring device.

10. The closure of claim 9, wherein:
the measuring device further comprises a handle; and
the retention element further comprises a catch extending from the lid, the catch configured to engage the handle.

11. The closure of claim 9, further comprising:
the collar having an outer surface and a first locking portion;
the lid having a second outer surface and a second locking portion, the second locking portion operable to releasably engage the first locking portion when the lid is in the closed position, thereby securing the lid to the collar in the closed position;
a first latch element located on the outer surface of the collar; and
a second latch element located on the second outer surface of the lid, the first latch element operable to releasably engage the second latch element when the lid is in the closed position, thereby further securing the lid to the collar in the closed position;
wherein the lid is pivotally attached to the collar.

* * * * *